United States Patent
Merrill et al.

(10) Patent No.: US 7,704,596 B2
(45) Date of Patent: Apr. 27, 2010

(54) SUBSURFACE INCLUSION OF FUGITIVE OBJECTS AND METHODOLOGY FOR STRENGTHENING A SURFACE BOND IN A HYBRID CERAMIC MATRIX COMPOSITE STRUCTURE

(75) Inventors: Gary B. Merrill, Orlando, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/235,662

(22) Filed: Sep. 23, 2008

(65) Prior Publication Data
US 2010/0075106 A1    Mar. 25, 2010

(51) Int. Cl.
B32B 17/12    (2006.01)
B32B 18/00    (2006.01)

(52) U.S. Cl. .............. 428/293.4; 428/307.3; 428/320.2; 416/241 B

(58) Field of Classification Search ........................ None
See application file for complete search history.

(56) References Cited

U.S. PATENT DOCUMENTS

| | | | |
|---|---|---|---|
| 4,289,447 A | 9/1981 | Sterman et al. | |
| 4,639,388 A | 1/1987 | Ainsworth et al. | |
| 5,064,727 A | 11/1991 | Naik et al. | |
| 5,080,934 A | 1/1992 | Naik et al. | |
| 5,124,006 A | 6/1992 | Fayeulle et al. | |
| 5,223,064 A * | 6/1993 | Gadkaree | 156/89.25 |
| 5,252,279 A | 10/1993 | Gore et al. | |
| 5,310,592 A | 5/1994 | Baker et al. | |
| 5,435,889 A | 7/1995 | Dietrich | |
| 5,558,789 A | 9/1996 | Singh | |
| 5,674,585 A | 10/1997 | Ewing et al. | |
| 5,894,053 A | 4/1999 | Fried | |
| 6,013,592 A | 1/2000 | Merrill et al. | |
| 6,074,706 A | 6/2000 | Beverley et al. | |
| 6,197,424 B1 | 3/2001 | Morrison et al. | |
| 6,235,370 B1 | 5/2001 | Merrill et al. | |
| 6,251,526 B1 | 6/2001 | Staub | |
| 6,291,049 B1 | 9/2001 | Kunkel et al. | |
| 6,316,078 B1 | 11/2001 | Smialek | |
| 6,444,331 B2 | 9/2002 | Ritter et al. | |
| 6,457,939 B2 | 10/2002 | Ghasripoor et al. | |
| 6,503,574 B1 | 1/2003 | Skelly et al. | |
| 6,541,134 B1 | 4/2003 | Strangman et al. | |
| 6,652,227 B2 | 11/2003 | Fried | |
| 6,720,087 B2 | 4/2004 | Fried et al. | |
| 6,846,574 B2 | 1/2005 | Subramanian | |

(Continued)

*Primary Examiner*—Callie E Shosho
*Assistant Examiner*—Frank D Ducheneaux

(57) ABSTRACT

A hybrid ceramic matrix composite (CMC) structure 10 and method for fabricating such an structure are provided. A CMC substrate 12 includes layers 16, 18, 20 of ceramic fibers. Fugitive objects 22 are disposed on at least one of the plurality of layers prior to laying a subsequent layer of ceramic fibers. An outer surface of the subsequent layer influences a shape of the outer surface of the substrate by defining protuberances 24 on the outer surface of the substrate where respective cavities 26 are formed beneath respective protuberances upon dissipation of the fugitives. A liquefied ceramic coating 34 is deposited on the outer surface of the ceramic substrate to fill the cavities. When the ceramic coating is cured to a solidified state, the cavities containing the solidified coating constitute an anchoring arrangement between the ceramic substrate and the ceramic coating.

6 Claims, 3 Drawing Sheets

U.S. PATENT DOCUMENTS

| | | |
|---|---|---|
| 6,984,277 B2 | 1/2006 | Morrison et al. |
| 7,153,096 B2 | 12/2006 | Thompson et al. |
| 7,220,458 B2 | 5/2007 | Hollis et al. |
| 2001/0007719 A1* | 7/2001 | Maloney .................... 428/633 |
| 2002/0004142 A1 | 1/2002 | Ritter et al. |
| 2002/0004143 A1 | 1/2002 | Hasz et al. |
| 2002/0009609 A1* | 1/2002 | Ritter et al. ................. 428/608 |
| 2005/0076504 A1* | 4/2005 | Morrison et al. ......... 29/889.72 |
| 2007/0020105 A1* | 1/2007 | Albrecht et al. ............. 416/224 |

* cited by examiner

SUBSURFACE INCLUSION OF FUGITIVE OBJECTS AND METHODOLOGY FOR STRENGTHENING A SURFACE BOND IN A HYBRID CERAMIC MATRIX COMPOSITE STRUCTURE

FIELD OF THE INVENTION

The present invention is generally related to ceramic structures for use in a high temperature combustion environment, and, more particularly, to structural arrangements and techniques for strengthening a surface bond between corresponding surfaces of an insulating ceramic coating and ceramic matrix composite (CMC) substrate, which is thermally protected by the ceramic coating.

BACKGROUND OF THE INVENTION

Engine components in the hot gas flow of modern combustion turbines are required to operate at ever-increasing temperatures as engine efficiency requirements continue to advance. Ceramics typically have higher heat tolerance and lower thermal conductivities than metals, particularly in the case of oxide-based ceramic materials. For this reason, ceramics have been used both as structural materials in place of metallic materials and as coatings for both metal and ceramic structures. Ceramic matrix composite (CMC) wall structures with ceramic insulation outer coatings, such as described in commonly owned U.S. Pat. No. 6,197,424, have been developed to provide components with the high temperature stability of ceramics without the brittleness of monolithic ceramics.

The versatility of an insulated CMC material may be influenced by the strength of the bond between the insulation and the structural CMC material. For example, some environments and/or engine components may require an incremental bonding strength relative to baseline bond strength. Accordingly, further improvements that increment the bonding strength between the insulation and the structural CMC material are desired.

BRIEF DESCRIPTION OF THE DRAWINGS

The invention is explained in the following description in view of the drawings that show.

DETAILED DESCRIPTION OF THE INVENTION

In accordance with one or more embodiments structures and methods for fabricating a hybrid ceramic matrix composite structure are described herein. In the following detailed description, various specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
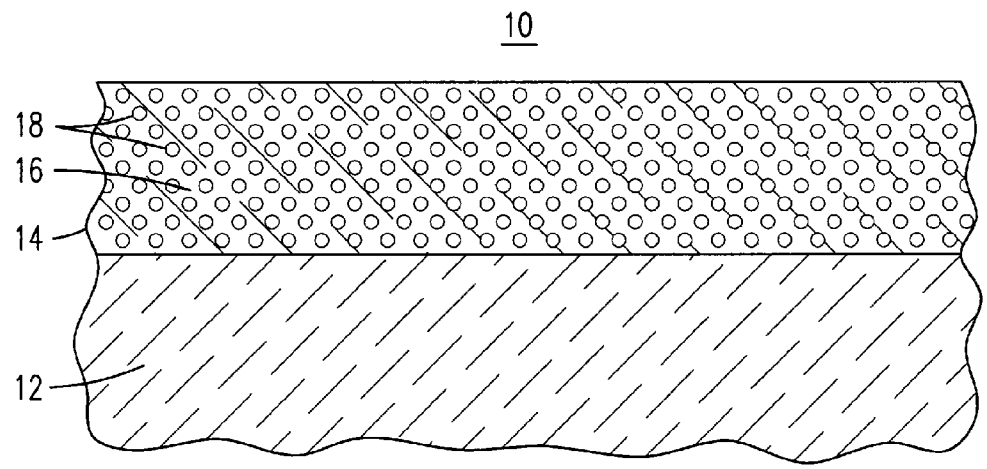
FIG. 1 is a partial cross-sectional view of a hybrid ceramic structure for use in a high temperature combustion environment.

FIG. 1 is a partial cross-sectional view of a finished hybrid ceramic structure 10 for use in a high temperature combustion environment, such as in a gas turbine engine. The hybrid ceramic structure 10 is formed of a substrate 12 of an oxide-based ceramic matrix composite (CMC) material that is thermally protected by a thermally-insulating ceramic coating 14. The ceramic matrix composite substrate 12 and ceramic coating 14 may be of the type described in U.S. Pat. No. 6,013,592, incorporated by reference herein. The ceramic matrix composite substrate 12 includes at least one layer of ceramic fibers beneath a surface of the substrate. Ceramic coating 14 may be an oxide-based ceramic including a matrix material 16 surrounding a plurality of mullite (or alumina rich mullite) 18 geometric shapes (e.g., spheres). The matrix material 16 may include a mullite or alumina rich mullite filler powder and a phosphate binder or an alumina filler powder and an alumina binder. One or more optional oxide bond layers (not shown) may be disposed between the ceramic matrix composite substrate 12 and the ceramic insulating coating 14 and may comprise one or more of the group of mullite, alumina, and zirconia or other stable oxide materials of similar range coefficients of thermal expansion.

The inventors of the present invention propose structural arrangements and techniques conducive to strengthening a surface bond between corresponding surfaces of insulating ceramic coating 14 and CMC substrate 12. Aspects of the present invention propose an innovative sub-surface inclusion of fugitive objects that define sub-surface cavities in the CMC substrate that may be used to receive a liquefied coating and upon solidification of the coating provide mechanical anchoring (i.e., an integrally-constructed mechanical interlock) between coating 14 and CMC substrate 12.

Figure 2:
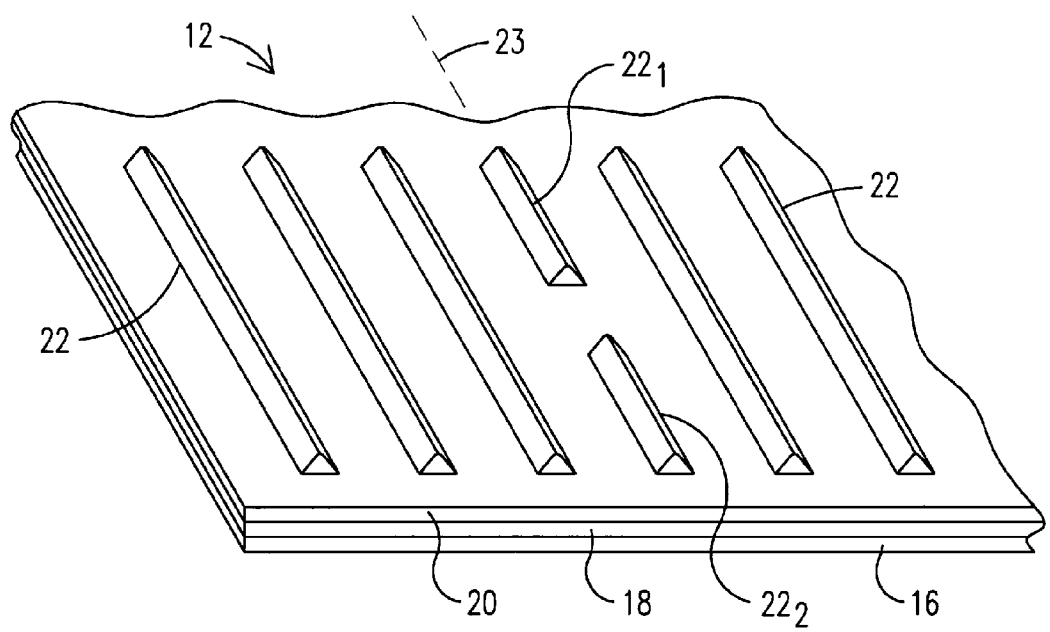
FIG. 2 is an isometric view of an arrangement of successive layers of ceramic fibers in a CMC substrate and further illustrates an example arrangement of a plurality of fugitive objects that may be disposed on at least one of the plurality of layers.

As shown in FIG. 2, CMC substrate 12 may be formed of a plurality of layers of ceramic fibers, such as layers 16, 18, and 20 and one or more subsequent layers (not shown in FIG. 2)

yet to be disposed over layer 20 to form a layering arrangement of successive layers of ceramic fibers.

In one example embodiment, one can arrange a plurality of spaced apart objects 22 (e.g., fugitive objects) on at least one of the plurality of layers (e.g., layer 20) prior to laying a subsequent layer of ceramic fibers onto layer 20. It will be appreciated that objects 22 may be arranged and may be shaped in any of various forms. For example, the cross-sectional shape of objects 22 may be cornerless, (e.g., cylindrical shape), or may have corners, (e.g., polygonal shape) or a combination of the foregoing shapes. Moreover, a given object 22 need not be a continuous structure along its longitudinal axis since the given object can be made up of discrete segments, such as segments $22_1$ and $22_2$ that extend along a longitudinal axis 23. Also the positioning of objects 22 need not exhibit any particular directional alignment. For example, objects 22 need not extend parallel or perpendicular relative to the edges of CMC substrate 12. For example, objects 22 could extend at an acute angle relative to such edges, or objects 22 could be arranged to form a crisscross pattern, or may be arranged in a random pattern. It will be appreciated that objects 22 need not be limited to fugitive objects since appropriate combinations of fugitive and non-fugitive objects may be used depending on the needs of a given application.

Figure 3:
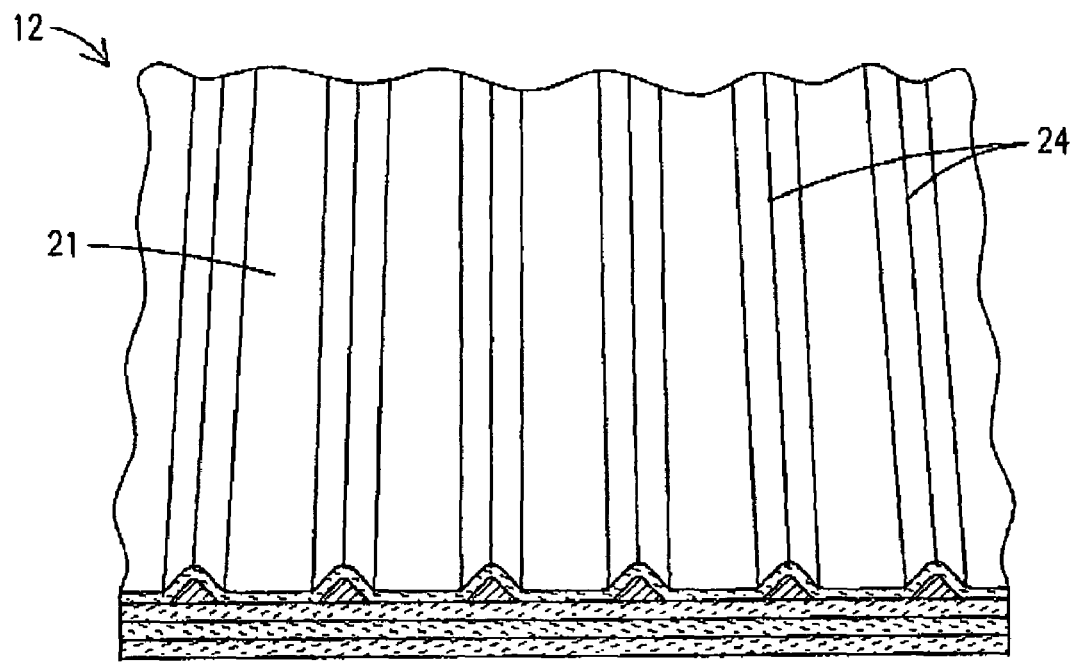
FIG. 3 is an isometric view of an example of protuberances formed on the outer surface of the ceramic substrate that may result from the arrangement of the objects shown in FIG. 2.

As can be appreciated in FIG. 3, an outer surface 21 of the subsequent layer influences a shape of the outer surface of the CMC substrate 12 by defining a plurality of protuberances 24 on the outer surface of the substrate. It will be appreciated that the outer surface of the subsequent layer may be (but need not be) the outer surface of the substrate.

Figure 4:
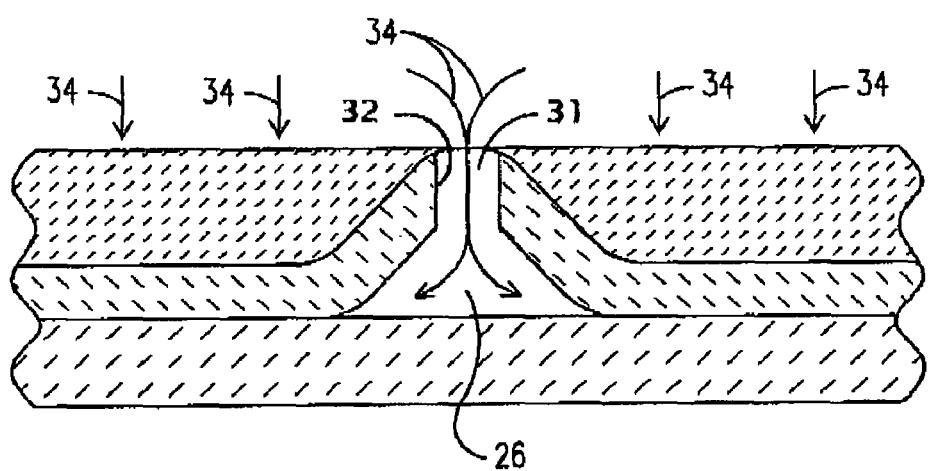
FIG. 4 is a cross-sectional view of an example cavity that can form beneath a respective protuberance on the outer surface of the ceramic substrate upon dissipation of the fugitive object.
Figure 5:
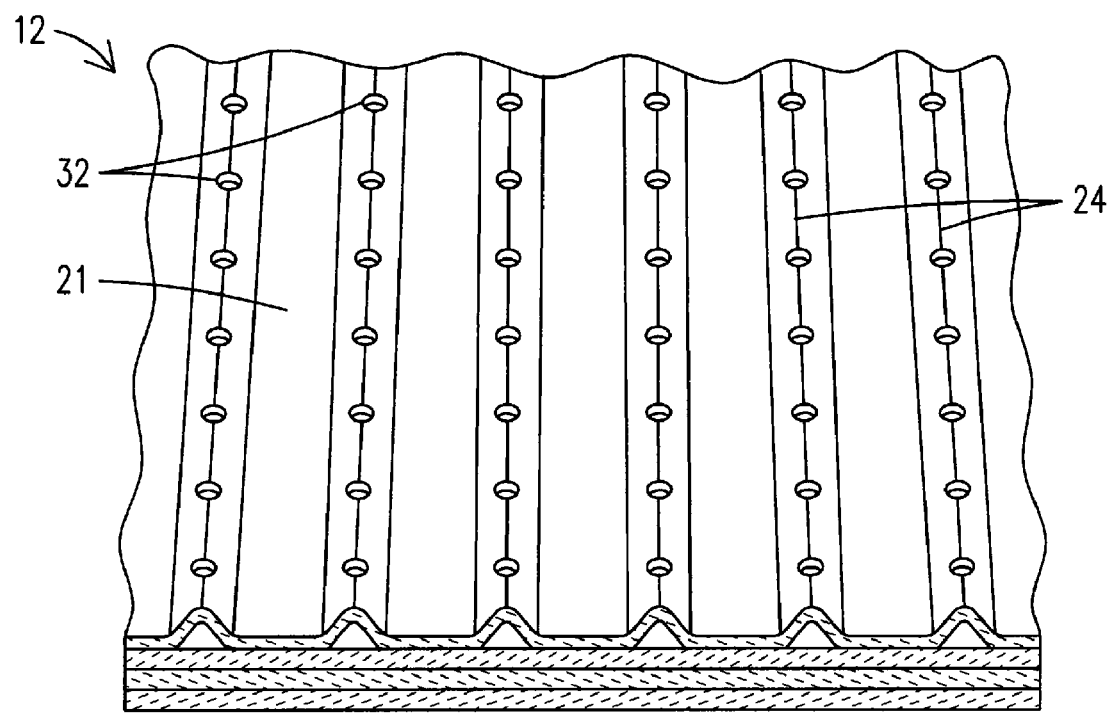
FIG. 5 an isometric view of an example arrangement of entrances to the subsurface-cavities formed in the ceramic substrate, which entrances allow passage into the cavities to at least some of a ceramic coating deposited on the substrate in a fluid state, and upon solidification becomes an anchoring arrangement between the ceramic substrate and the ceramic coating.

One can then process (e.g., apply heat) CMC substrate 12 to dissipate the fugitive objects and form respective cavities 26 (FIG. 4) beneath respective protuberances. The fugitive objects should be of a material having relatively low-char characteristics so that they burn out in a relatively clean manner and avoid the possibility of damage during burnout to the CMC substrate 12 (which at this stage may be in a green body state). In one example embodiment, the fugitive objects may be made of styrene material.

A plurality of openings 31 (FIG. 4) may be formed (e.g., through cutting, drilling, machining, etc.) in at least some of the plurality of protuberances to define respective entrances to the cavities. One can then deposit ceramic coating 14 in a fluid state (schematically represented by arrows 34 in FIG. 4) on the outer surface of the ceramic substrate. As will be appreciated by one skilled in the art, the ceramic coating is generally applied upon completion of various customary preliminary substrate processing steps—e.g., after substrate drying, partial curing, tooling removal and/or partial sintering.

At this stage, the respective entrances 32 defined by openings 31 allow to pass at least some or all of the fluid into the cavities 26. The ceramic coating 14 may then be cured to a solidified state, and in this manner the cavities together with the solidified coating in the cavity become an anchoring arrangement (i.e., an integrally constructed mechanical interlock) between the ceramic substrate and the ceramic coating. The shape of cavity 26 (which is based on the shape of objects 22) may be configured to inhibit certain crack-growth and improve fatigue strength of the mechanical interlock.

It will be appreciated that the distribution of the entrances 32 over outer surface 21 and thus the resulting distribution of the anchoring arrangements may be suitably arranged to meet the bonding requirements of a given application in an optimized manner. For example, for regions where a bonding strength requirement may be relatively higher, (e.g., a leading edge of the component) the number of entrances 32 per a unit of surface area (e.g., density) (and the concomitant resulting anchoring arrangements) over such a region may be increased relative to a region with a lesser bonding strength requirement.

In addition to the bonding enhancement that results from the foregoing anchoring arrangement between the ceramic substrate and the ceramic coating, it will be appreciated that the plurality of protuberances on the outer surface of the CMC substrate (by themselves) constitute a bond-enhancing arrangement between the surface of the ceramic substrate and a corresponding boundary of the coating. Thus in some example embodiments the designer may choose to reach a desired bonding strength through respective combinations of 1) anchoring arrangements (e.g., using fugitive objects, sub-surface cavity formation, cavity filling with liquefied coating, and fluid-to-solid processing of the coating); and 2) protuberance formation on the outer surface of the CMC substrate (e.g., using fugitive or non-fugitive objects).

Figure 6:
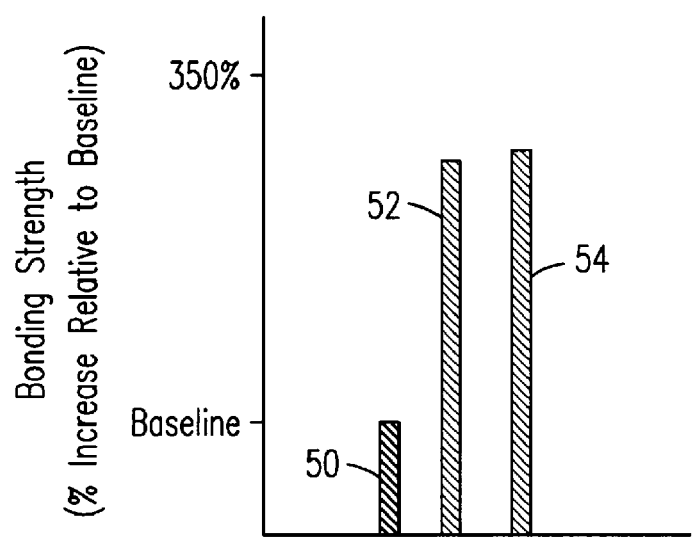
FIG. 6 is a comparative plot of examples of enhanced bonding strength, as obtained in accordance with aspects of the present invention, relative to a baseline bonding strength.

FIG. 6 is a comparative plot of examples of enhanced bonding strength, as obtained in accordance with aspects of the present invention, relative to a known baseline bonding strength represented by bar 50. Bar 52 represents an example of enhanced bonding strength obtained when using the example geometric arrangement illustrated in FIG. 2 for the fugitive objects. Bar 54 represents an example of enhanced bonding strength obtained by way of protuberance formation on the outer surface of the CMC substrate.

While various embodiments of the present invention have been shown and described herein, it will be understood that such embodiments are provided by way of example only. Numerous variations, changes and substitutions may be made without departing from the invention herein. Accordingly, it is intended that the invention be limited only by the spirit and scope of the appended claims.

The invention claimed is:

1. A hybrid ceramic matrix composite structure, comprising:
   a ceramic matrix composite substrate including a plurality of layers of ceramic fibers;
   a plurality of spaced apart fugitive objects disposed on at least one of the plurality of layers prior to laying a subsequent layer of ceramic fibers onto said at least one of the plurality layers, wherein, due to the fugitive objects, an outer surface of said subsequent layer influences a shape of an outer surface of the substrate by defining a plurality of protuberances on the outer surface of the substrate, wherein respective cavities are formed beneath respective protuberances upon dissipation of the fugitive objects, wherein respective openings define respective entrances to the cavities;
   a ceramic coating deposited in a fluid state on the outer surface of the ceramic substrate, wherein the respective entrances pass at least some of the fluid into the cavities to fill the cavities, wherein the ceramic coating is cured to a solidified state, wherein the cavities containing the solidified coating constitute an anchoring arrangement between the ceramic substrate and the ceramic coating.

2. The structure of claim 1 wherein the plurality of protuberances constitutes a bond-enhancing arrangement between the outer surface of the ceramic substrate and a corresponding boundary of the coating.

3. The structure of claim 2, wherein a total bonding strength between the ceramic substrate and the ceramic coating results from a first bonding strength contribution based on the anchoring arrangement between the ceramic substrate and the ceramic coating, and from a second bonding strength contribution based on the protuberances on the outer surface of the substrate and a resulting increase in the surface area of the substrate.

4. The structure of claim 1, further comprising a plurality of spaced apart non-fugitive objects on said at least one of the plurality of layers.

5. The structure of claim 4, wherein a shape for the plurality of spaced apart fugitive objects and/or the plurality of spaced apart non-fugitive objects is selected from the group consisting of a cornerless shape, and a shape including corners.

6. The structure of claim 4, wherein the plurality of spaced apart fugitive objects and/or the plurality of spaced apart non-fugitive objects are arranged in a pattern selected from the group consisting of a random pattern, a crisscrossing pattern, a pattern having an ordered orientation relative to edges of the ceramic substrate, and a combination of the foregoing patterns.

* * * * *